(12) United States Patent
Imanishi (10) Patent No.: US 9,069,123 B2
(45) Date of Patent: Jun. 30, 2015

(54) LENS DEVICE, DRIVE METHOD, RECORDING MEDIUM, AND IMAGE-CAPTURING DEVICE

(71) Applicant: FUJIFILM Corporation, Tokyo (JP)

(72) Inventor: Kazutaka Imanishi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/327,062

(22) Filed: Jul. 9, 2014

(65) Prior Publication Data

US 2014/0313392 A1    Oct. 23, 2014

Related U.S. Application Data

(63) Continuation of application No. PCT/JP2013/050758, filed on Jan. 17, 2013.

(30) Foreign Application Priority Data

Jan. 18, 2012    (JP) ................. 2012-008256

(51) Int. Cl.
*G02B 13/16* (2006.01)
*H04N 5/225* (2006.01)
(Continued)

(52) U.S. Cl.
CPC *G02B 7/04* (2013.01); *G03B 17/14* (2013.01); *G03B 2206/00* (2013.01); *H04N 5/23296* (2013.01); *G02B 7/102* (2013.01)

(58) Field of Classification Search
CPC .............. H04N 5/224; H04N 5/23203; H04N 5/23209; H04N 5/2254; G03B 2205/0069
USPC ........... 348/335, 360; 359/824; 388/806, 815, 388/821, 823, 833, 847, 854, 934
See application file for complete search history.

(56) References Cited

U.S. PATENT DOCUMENTS 6,501,505 B1 * 12/2002 Kawamura et al. ........ 348/240.3
7,035,021 B2 * 4/2006 Sasaki et al. .................. 359/701
(Continued)

FOREIGN PATENT DOCUMENTS

| JP | 2001-66489 A | 3/2001 |
| JP | 2003-264723  * | 9/2003 |

(Continued)

OTHER PUBLICATIONS

International Preliminary Report on Patentability issued in PCT/JP2013/050758, dated May 2, 2014.
(Continued)

*Primary Examiner* — Lin Ye
*Assistant Examiner* — Chriss Yoder, III
(74) *Attorney, Agent, or Firm* — Birch, Stewart, Kolasch & Birch, LLP (57) ABSTRACT

According to an aspect of the present invention, when driving one optical member at a time, the control part sets a first current equal to or more than a rated current of the driving part and equal to or less than a maximum supply current from the image-capturing device body, or a second current less than the rated current of the driving part, for the one optical member as the current limit value, and controls the driving part so that first drive for driving the optical member for a first time by allowing the first current to serve as the current limit value, and second drive for driving the optical member for a second time by allowing the second current to serve as the current limit value after the first drive being performed, are repeated until drive of the optical member to the drive target is completed.

7 Claims, 7 Drawing Sheets

(51) Int. Cl.
  *G02B 7/04* (2006.01)
  *G03B 17/14* (2006.01)
  *H04N 5/232* (2006.01)
  *G02B 7/10* (2006.01)

(56) References Cited

U.S. PATENT DOCUMENTS

2011/0071663 A1   3/2011   Honda
2012/0154927 A1*  6/2012   Kasuya ................. 359/698

FOREIGN PATENT DOCUMENTS

JP      2003-264723 A      9/2003
WO   WO 2009/142122 A1   11/2009

OTHER PUBLICATIONS

International Search Report issued in PCT/JP2013/050758, dated Apr. 2, 2013.
Written Opinion of the International Searching Authority issued in PCT/JP2013/050758, dated Apr. 2, 2013.

* cited by examiner

LENS DEVICE, DRIVE METHOD, RECORDING MEDIUM, AND IMAGE-CAPTURING DEVICE

CROSS-REFERENCE TO RELATED APPLICATIONS

This application is a Continuation of PCT International Application No. PCT/JP2013/050758 filed on Jan. 17, 2013, which claims priority under 35 U.S.C. §119(a) to Japanese Patent Application No. 2012-008256 filed on Jan. 18, 2012. Each of the above application(s) is hereby expressly incorporated by reference, in its entirety, into the present application.

BACKGROUND OF THE INVENTION

1. Field of the Invention

The present invention relates to a lens device, and drive of an optical member in an image-capturing device including the lens device.

2. Description of the Related Art

In recent years, a digital camera with an interchangeable lens has gradually become widespread. In such a camera, a drive command is transmitted from a camera body to a lens device so that a motor provided in the lens device drives an optical member (such as a zoom lens, a focus lens, and a diaphragm) in many cases. If a current supplied to a motor driver (driving circuit) exceeds a rated current at the time of the drive, there is a possibility of heat generation and malfunction. Thus, in Japanese Patent Application Laid-Open No. 2001-066489, for example, a value of a maximum rated current, which can be supplied, is transmitted from a camera body to an interchangeable lens so that an operation of a lens drive mechanism is controlled in a range within the maximum rated current.

SUMMARY OF THE INVENTION

Unfortunately, in Japanese Patent Application Laid-Open No. 2001-066489 above, a drive speed is restricted by the maximum rated current, and decreasing and increasing an aperture, and driving an AF operation and the like, are individually performed, so that there is a problem in which a drive time becomes long due to transmission and reception of a drive command between a camera body and a lens.

The present invention has been achieved under the circumstances above, and has an object to provide a lens device, a drive method, a lens drive program, and a recording medium, capable of completing drive of an optical member in a short time, and provide an image-capturing device including the lens device.

In order to achieve the object above, in a first aspect of the present invention there is provided a lens device to be mounted on an image-capturing device body, the lens device including: a receiving part for receiving a drive command including an optical member to be a drive object and a drive target of the optical member from the image-capturing device body; a driving part for driving the optical member to the drive target with a current equal to or less than a current limit value on the basis of the drive command; and a control part for controlling the driving part. When driving one optical member at a time, the control part sets a first current equal to or more than a rated current of the driving part and equal to or less than a maximum supply current from the image-capturing device body, or a second current less than the rated current of the driving part, for the one optical member as the current limit value, and controls the driving part so that first drive for driving the optical member for a first time by allowing the first current to serve as the current limit value, and second drive for driving the optical member for a second time by allowing the second current to serve as the current limit value after the first drive being performed, are repeated until drive of the optical member to the drive target is completed.

The lens device in accordance with the first aspect is configured so that when one optical member is driven at a time, the first drive for driving the optical member for the first time by allowing the first current equal to or more than the rated current of the driving part to serve as the current limit value, and the second drive for driving the optical member for the second time with the second current less than the rated current of the driving part after the first drive being performed for the first drive time, are repeated for the optical member until the drive is completed. Thus, it is possible to complete drive of an optical member such as a lens and a diaphragm in a short time by performing the first drive, as well as it is possible to prevent heat generation and malfunction of a circuit caused by driving for a long time with the first current equal to or more than a rated current. The first and second drive times can be determined in accordance with characteristics of a driving circuit and so on. In each of aspects of the present invention, a "rated current" indicates a "current allowed to continuously flow". In addition, in each of aspects of the present invention, a "drive target" indicates a target of a state that each of optical members should achieve by performing the drive. In a case where a focus lens is driven, for example, a lens position for focusing on a subject at a required focal degree can be indicated as the "drive target", and in a case where a zoom lens is driven, a lens position where a subject image becomes a desired magnification can be indicated as the "drive target". Further, in a case where a diaphragm is driven, a diaphragm position where exposure of a subject becomes a desired state can be indicated as the "drive target".

As shown in a second aspect of the present invention, in the lens device in accordance with the first aspect, when allowing a plurality of optical members to be simultaneously driven, the control part may set a third current as a current limit value, which third current is less than a rated current of each of the plurality of optical members, and a total of the third current of each of the plurality of optical members is to be a maximum supply current or less.

In the second aspect, it is possible to simultaneously drive a plurality of optical members by allowing the third current to serve as a current limit value to complete the drive in a short time.

As shown in a third aspect of the present invention, in the lens device in accordance with the second aspect, when turning on and off a power source, the control part may set the third current as a current limit value without relying on contents of the drive command. Accordingly, in a case of performing predetermined drive (such as detecting home positions of a lens and a diaphragm, driving to an initial position, and moving to a retreat position) such as when turning on and off the power source, communication between the image-capturing device body and the lens device becomes unnecessary, thereby enabling drive of the lens and the diaphragm or the like to be completed in a short time.

As shown in a fourth aspect of the present invention, in the lens device in accordance with any one of the first to third aspects, the optical member may be at least one of the zoom lens, the focus lens, and the diaphragm. The fourth aspect defines a drive object in the lens device.

In order to achieve the object above, in a fifth aspect of the present invention there is provided a drive method of a lens device to be mounted on an image-capturing device body, the drive method including the steps of: receiving a drive command including an optical member to be a drive object and a drive target of the optical member from the image-capturing device body; driving the optical member to the drive target with a current equal to or less than a current limit value on the basis of the drive command; and controlling the drive in the step of driving. In the step of controlling, when one optical member is driven at a time, a first current equal to or more than a rated current of the driving part of the one optical member and equal to or less than a maximum supply current from the image-capturing device body, or a second current less than the rated current of the driving part, is set for the one optical member as the current limit value, and the driving part is controlled so that first drive for driving the optical member for a first time by allowing the first current to serve as the current limit value, and second drive for driving the optical member for a second time by allowing the second current to serve as the current limit value after the first drive being performed, are repeated until drive of the optical member to the drive target is completed.

In the drive method in accordance with the fifth aspect, similar to the drive device in accordance with the first aspect, it is possible to complete drive of an optical member in a short time as well as to prevent heat generation and malfunction of a circuit caused by driving for a long time with the first current equal to or more than a rated current. The first and second drive times can be determined in accordance with characteristics of a driving circuit or the like, similar to the lens device in accordance with the second aspect.

In the drive method in accordance with the fifth aspect, when a plurality of optical members is simultaneously driven, a third current may be set as a current limit value in the step of controlling, which third current is less than a rated current of each of the plurality of optical members, and a total of the third current of each of the plurality of optical members is to be a maximum supply current or less. In the drive method of the aspect above, similar to the drive device in accordance with the second aspect, it is possible to complete movement of an optical member in a short time, as well as to prevent heat generation and malfunction of a circuit caused by driving for a long time with the first current equal to or more than a rated current.

In the drive method in accordance with the aspect above of the present invention, in the step of controlling, when a power source is turned on and off, the third current may be set as a current limit value without relying on contents of the drive command. In the drive method of the aspect above, similar to the lens device in accordance with the third aspect, in a case of performing predetermined drive (such as detecting home positions of a lens and a diaphragm, driving to an initial position, and moving to a retreat position) such as when turning on and off the power source, communication between the image-capturing device body and the lens device becomes unnecessary, thereby enabling drive of an optical member to be completed in a short time.

In the drive method in accordance with the aspect above, the optical member may be at least one of the zoom lens, the focus lens, and the diaphragm. The drive method of the aspect above, similar to the lens device in accordance with the fourth aspect, defines a drive object in the lens device.

In order to achieve the object described above, a sixth aspect of the present invention provides a drive program which allows the lens device to perform the drive method in accordance with any one of the aspects above of the present invention. In the drive program in accordance with the sixth aspect, similar to the drive method in accordance with the aspect above of the present invention, it is possible to complete drive of the optical member in a short time. The drive program in accordance with the sixth aspect may be stored in a memory mounted in an image-capturing device and a lens device (semiconductor memory) such as a ROM and an EEPROM, or may be used by being recorded in various recording media such as a magneto-optical recorder, such as a Compact Disk (CD), a Digital Versatile Disk (DVD), a hard disk, and a Solid State Drive (SSD). In addition, a seventh aspect of the present invention provides a recording medium in which the drive program in accordance with the sixth aspect is recorded. Recording into a recording medium is possible by storing codes of the drive program, which is readable by an image-capturing device, a lens device, and a computer, in various non-transitory recording media such as the semiconductor memory and the magneto-optical recorder described above. The recording medium in the sixth and seventh aspects may be incorporated in an image-capturing device, a lens device, and a computer, or may be mounted in a detachable manner.

In order to achieve the object above, in an eighth aspect of the present invention there is provided an image-capturing device, the image-capturing device including an image-capturing device body, and a lens device to be mounted on the image-capturing device body. The image-capturing device body includes a transmitting part for transmitting a drive command including an optical member to be a drive object and a drive target of the optical member to the lens device, and the lens device is any one of the lens devices according to first to fourth aspects. In the image-capturing device in accordance with the eighth aspect, similar to the lens device, the drive method, and the drive program, of the present invention described above, it is possible to complete the drive of the optical member in a short time.

As described above, according to the lens device, the lens drive method, the drive program, the recording medium, and the image-capturing device, in accordance with the present invention, it is possible to complete the drive of the optical member in a short time.

BRIEF DESCRIPTION OF THE DRAWINGS

FIG. 5 is a flow chart showing an example of setting of an output limit value and drive when a power source is turned on.

DETAILED DESCRIPTION OF THE EMBODIMENTS

Referring to the accompanying drawings, an embodiment of the lens device, the drive method and the drive program, and the image-capturing device, in accordance with the present invention, is described below in detail.

Configuration of the Image-Capturing Device

Figure 1:
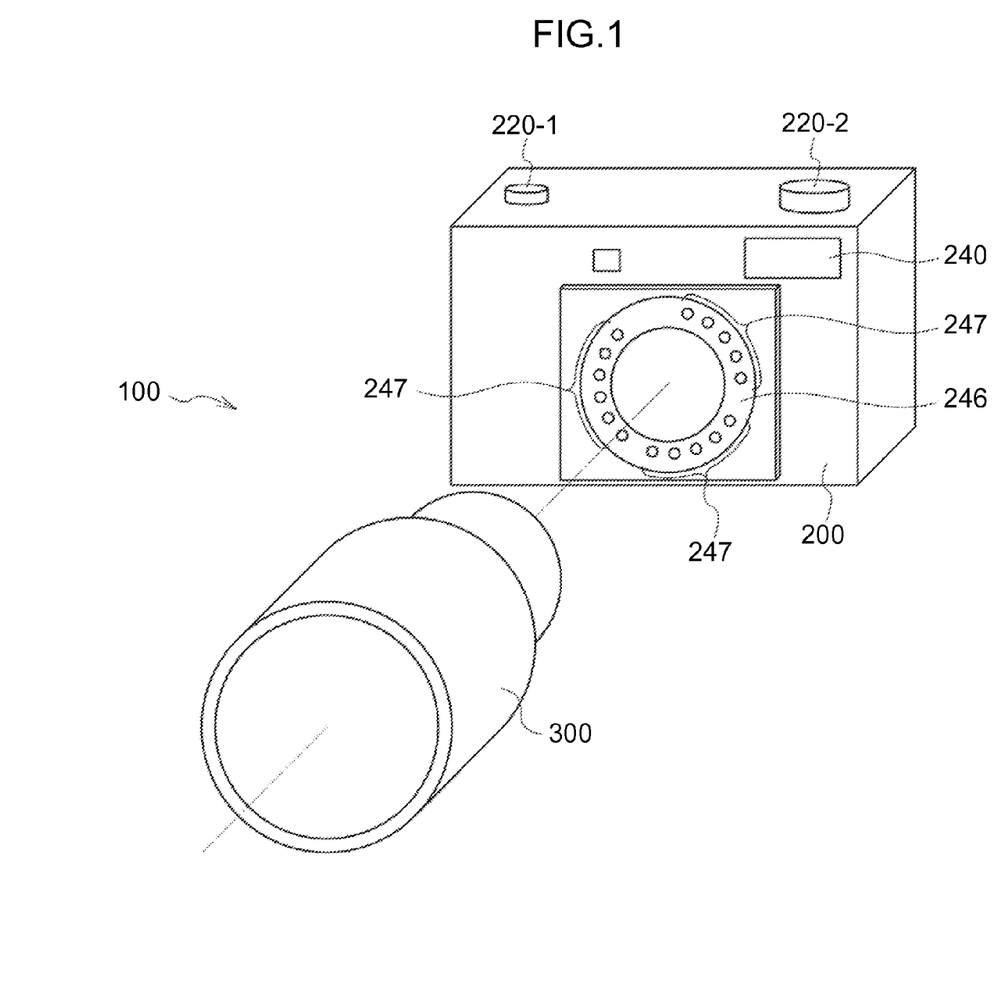
FIG. 1 is an external view of an image-capturing device 100 in accordance with one embodiment of the present invention.

FIG. 1 is a perspective view showing appearance of the image-capturing device 100 in accordance with one embodiment of the present invention. The image-capturing device 100 includes an image-capturing device body 200, and a lens device 300 to be mounted on the image-capturing device body 200 in an interchangeable manner. The lens device 300 is mounted on the image-capturing device body 200 in an interchangeable manner by connecting a mount 246 (a transmission part) provided on the image-capturing device body 200 to a mount 346 (a reception part) provided on the lens device 300, corresponding to the mount 246. In addition, the image-capturing device body 200 is provided on its front face with a flash 240 other than the mount 246, and on its top face with a release button 220-1 and a dial 220-2 for setting imaging modes.

Figure 2:
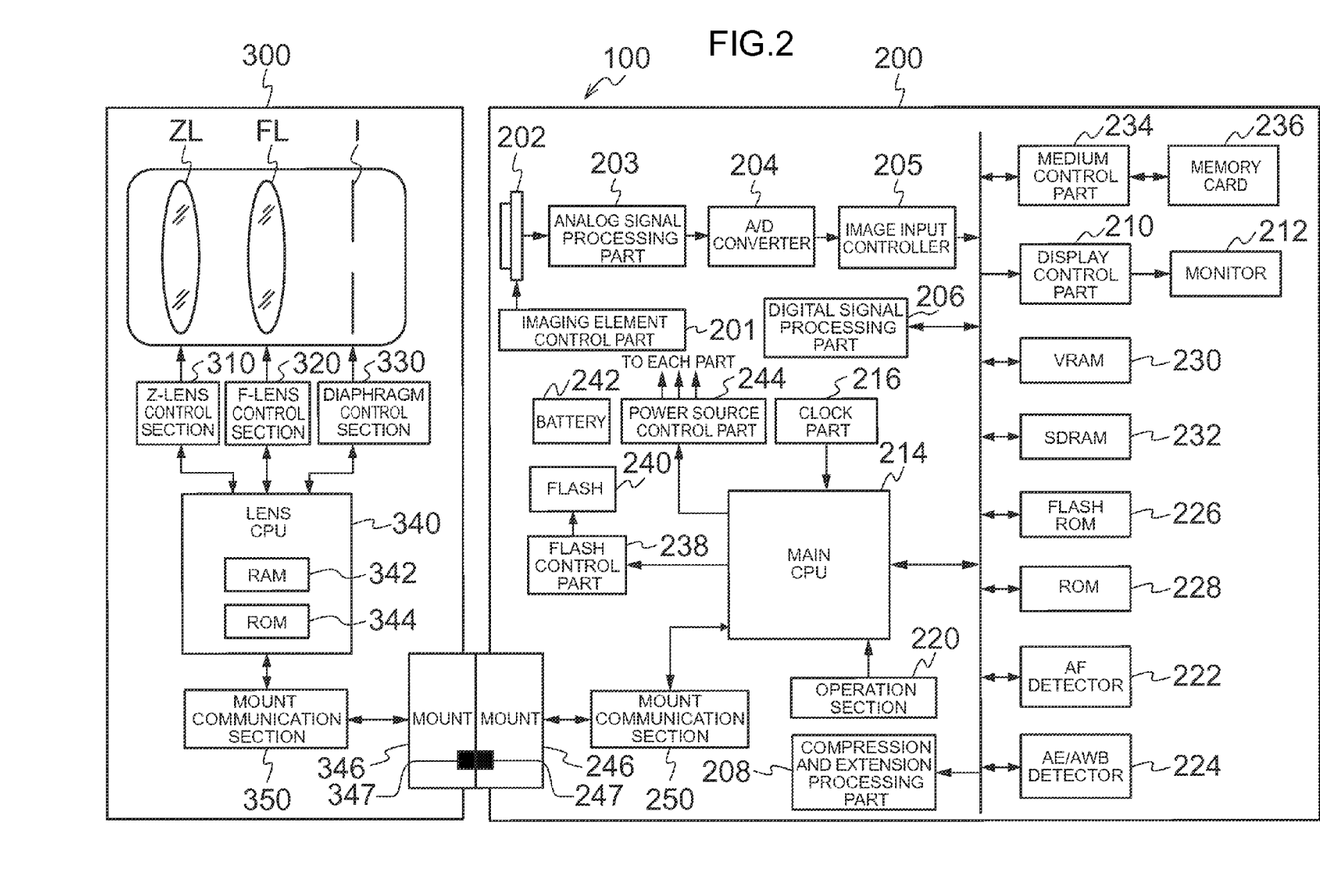
FIG. 2 is a block diagram showing configuration of a main section of the image-capturing device 100.

FIG. 2 is a block diagram showing the configuration of the image-capturing device 100. The operations of the image-capturing device 100 are integrally controlled by a main CPU 214 of the image-capturing device body 200 and a lens CPU 340 of the lens device 300. Programs (including drive programs for driving a zoom lens ZL, a focus lens FL, and a diaphragm I) and data required for operation of the main CPU 214 are stored in a flash ROM 226 and a ROM 228 in the image-capturing device body 200, and programs (including drive programs for driving a zoom lens ZL, a focus lens FL, and a diaphragm I) and data required for operation of the lens CPU 340 are stored in a ROM 344 in the lens CPU 340. In the present embodiment, although an example in which programs are stored in ROMs is described, the ROMs may be replaced with a rewritable device (an EEPROM or the like) to update programs as needed, or with a recording medium (such as a semiconductor memory, or a magneto-optical recording medium) detachable from the image-capturing device 100 to store programs, and use the stored programs.

The image-capturing device body 200 is provided with an operation section 220 including a reproduction button, a MENU/OK key, a cross key, a BACK key and the like, in addition to a release button 220-1 and a dial 220-2. Accordingly, a user can provide an instruction such as: selection of an imaging/reproduction mode; start of imaging; selection, reproduction, and elimination of an image; and a zoom instruction, by operating a button and a key included in the operation section 220. Signals from the operation section 220 is inputted into the main CPU 214 (a transmission part), and the main CPU 214 controls each of the circuits in the image-capturing device body 200 on the basis of the inputted signals as well as performs transmission and reception of the signals with the lens device 300 through the mount 246 (a reception part) and a mount communication section 250 (a reception part) as described later.

The mount 246 is provided with terminals 247 (a transmission part), and the mount 346 is provided with terminals 347 (a reception part). When the lens device 300 is mounted on the image-capturing device body 200, corresponding terminals 247 and terminals 347 are brought into contact with each other to enable communication (since the terminals 247 and the terminals 347 in FIGS. 1 and 2 are conceptually shown, positions and the number of the terminals in the present invention are not limited to those shown in FIGS. 1 and 2).

The terminals described above include, for example, a terminal for ground, a terminal for a synchronization signal, a terminal for serial communication, a terminal for control status communication, and a terminal for power supply from a battery 242 of the image-capturing device body 200 to each portion of the lens device 300.

In the imaging mode, subject light forms an image on a light receiving surface of an imaging element 202 of the image-capturing device body 200 through the zoom lens ZL, the focus lens FL, and the diaphragm I of the lens device 300.

In the present embodiment, although the imaging element 202 is a CMOS type, it is not limited to the CMOS type and a CCD type may be applied. The focus lens FL, the zoom lens ZL, and the diaphragm I are driven by a zoom lens control section 310 (a driving part, a controlling part), a focus lens control section 320 (a driving part, a controlling part), and a diaphragm control section 330 (a driving part, a controlling part) controlled by the lens CPU 340, thereby performing focus control, zoom control, and diaphragm control.

The zoom lens control section 310 moves the zoom lens ZL in an optical axis direction in accordance with a command from the lens CPU 340 to vary imaging power. The focus lens control section 320 allows the focus lens FL to move back and forth in the optical axis direction in accordance with a command from the lens CPU 340 to focus on a subject. The diaphragm control section 330 varies a diaphragm value of the diaphragm I in accordance with a command from the lens CPU 340.

When the release button 220-1 is pressed to a first level (half press), the main CPU 214 allows AF and AE operations to start. Accordingly, image data outputted from an A/D converter 21 is taken into an AE/AWB detector 224. The main CPU 214 calculates brightness (imaging Ev value) of the subject by using an integrated value of a G signal inputted into the AE/AWB detector 224, and controls a diaphragm value of the diaphragm I, an electric charge accumulation time (corresponding to a shutter speed) in the imaging element 202, a light emission time of the flash 240 and the like, on the basis of the calculated result.

An AF detector 222 is a part to perform contrast AF processing or phase difference AF processing. When performing the contrast AF processing, the AF detector 222 controls the focus lens FL in a lens barrel so that an AF evaluation value showing a focal state calculated by integrating high frequency components of image data of pixels in a focus region provided in an imaging region of the imaging element 202 becomes maximum. In addition, when performing the phase difference AF processing, the AF detector 222 controls the focus lens FL in the lens device 300 so that a defocus amount acquired by using phase difference data calculated by using image data of pixels (phase difference pixels) having a plurality of phase differences, the pixels being provided in the focus region above in the image data, becomes zero.

When the release button 220-1 is pressed to a second level (all press) after the AE operation and the AF operation are finished, the flash 240 emits light controlled through a flash control part 238. Signal charges accumulated in the imaging element 202 are read out on the basis of a read-out signal supplied from an imaging element control part 201 as voltage signals corresponding to the signal charges, and are supplied to an analog signal processing part 203. The analog signal processing part 203 applies correlated double sampling processing to the voltage signals outputted from the imaging element 202 to sample-and-hold R, G, B signals of each of the pixels, and supplies the R, G, B signals to an A/D converter 204 after amplifying the R, G, B signals. The A/D converter 204 converts sequentially received R, G, B analog signals into R, G, B digital signals to output the R, G, B digital signals to an image input controller 205. In a case where the imaging element 202 is a MOS type imaging element, the A/D converter 204 is often built in the imaging element 202, so that the correlated double sampling above is unnecessary.

Image data outputted from the image input controller 205 is inputted into a digital signal processing part 206, and then signal processing, such as off-set processing, gain control processing including white balance correction and sensitivity correction, gamma correction processing, and YC processing, is applied to the image data. Being written into a VRAM 230 and read out from the VRAM 230, the image data is encoded by the display control part 210 to be outputted to a monitor 212, whereby a subject image is displayed in the monitor 212.

Image data outputted from the A/D converter 204 in response to all press of the release button 220-1 is inputted into an SDRAM (memory) 232 from the image input controller 205, and is temporarily stored in the SDRAM 232. After the temporary storage in the SDRAM 232, the image data is formed into an image file through the signal processing, such as the gain control processing, the gamma correction processing, and the YC processing, by the digital signal processing part 206, and compression processing into a Joint Photographic Experts Group (JPEG) format by a compression and extension processing part 208. The image file is read out by a medium control part 234 to be recorded in a memory card 236. The image recorded in the memory card 236 can be reproduced and displayed in the monitor 212 by operating a reproduction button in the operation section 220.

The release button 220-1 is not limited to a configuration of a two-step stroke type including a half-press and an all-press. On-signals S1 and S2 may be outputted by one operation, and the on-signals S1 and S2 may be outputted by providing respective buttons or switches. In addition, in a configuration in which an operation is instructed with a touch panel and the like, an operation instruction may be outputted by touching a region corresponding to the operation instruction displayed in a screen of a touch panel serving as operation means. In the present invention, if a configuration is for instruction of imaging preparation processing and imaging processing, the configuration of operation means is not limited to the configuration described above. Further, one operation instruction in the operation means may allow imaging preparation processing and imaging processing to be continuously performed.

Communication Between an Image-Capturing Device Body and a Lens Device

Next, communication between the image-capturing device body 200 and the lens device 300 is described. The image-capturing device body 200 and the lens device 300 are communicated with each other through the mount 246 (a transmitting part) and the mount communication section 250 (a transmitting part) of the image-capturing device body 200, and the mount 346 (a receiving part) and a mount communication section 350 (a receiving part) of the lens device, and also through terminals provided in the mount 246 and the mount 346, in order to transmit and receive a drive command. The drive command includes an optical member to be a drive object (the zoom lens ZL, the focus lens FL, and the diaphragm I), and a target state of the optical member (target positions of the zoom lens ZL and the focus lens FL, a diaphragm value of the diaphragm I, and the like). Between the image-capturing device body 200 and the lens device 300, various control statuses (notification of start and completion of lens drive, and the like) other than the command above are communicated through terminals for control status communication (terminals for busy signals).

Configuration of the Focus Lens Control Section

Figure 3:
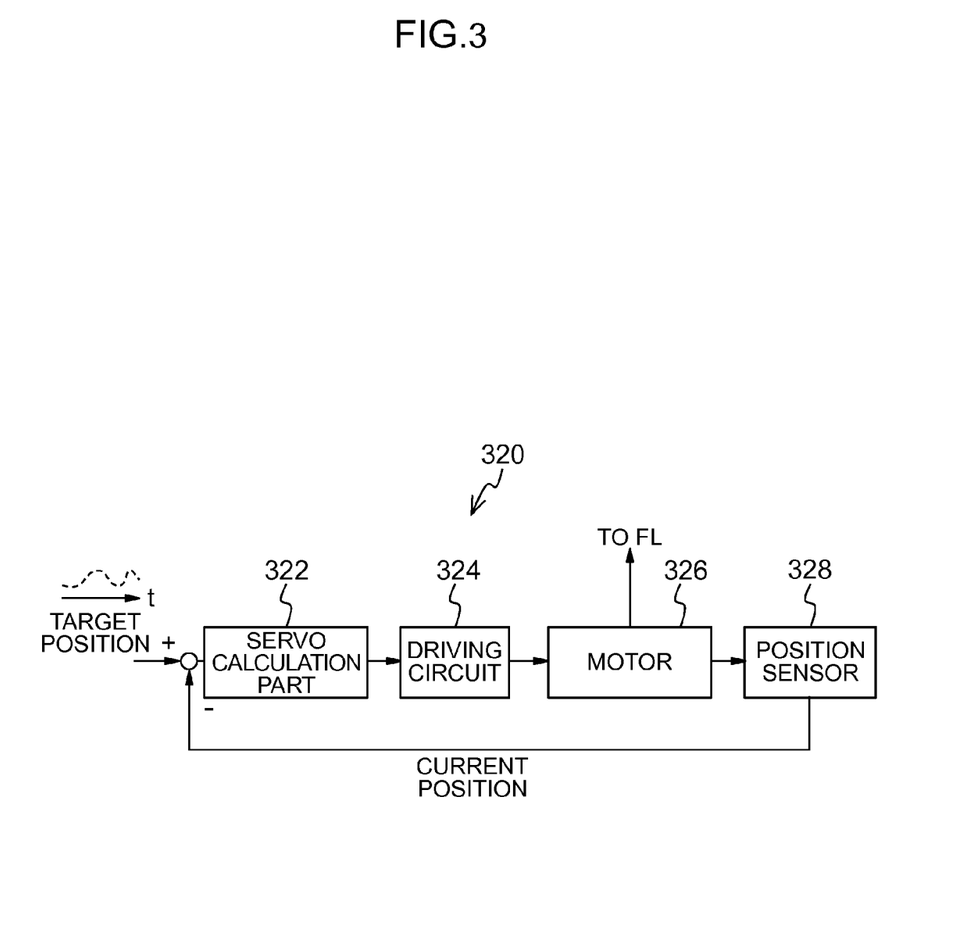
FIG. 3 is a block diagram showing configuration of a focus lens control section 320.

Next, configuration of the focus lens control section 320 (a driving part and a control part) is described. FIG. 3 is a block diagram showing configuration of the focus lens control section 320. The servo calculation part 322 performs servo calculation by using the lens target position received from the lens CPU 340 (a receiving part, a driving part, and a control part) and the current lens position received from the position sensor 328 to drive the motor 326 through the driving circuit 324 on the basis of the result of the servo calculation, thereby moving the focus lens FL back and forth along the optical axis direction. A current position of the focus lens FL in the optical axis direction is detected by a position sensor 328 and is inputted into a servo calculation part 322 to be used for servo calculation. The calculation is performed on the basis of the drive program stored in the ROM 344 and data required for the lens drive program by allowing a RAM 342 to serve as a temporary working area.

A pulse drive motor, such as a stepping motor and a servo motor, is applicable to the motor 326. When the pulse drive motor is used, a drive speed of the focus lens FL is changed by controlling a duty ratio of a pulse to be applied to the motor. The motor 326 is provided with a male screw. On the other hand, the focus lens FL is attached to a female screw part. The male screw is to be screwed into a female thread formed on an inner surface of a through-hole provided in the female screw part. Accordingly, as the motor 326 rotates, the male screw rotates to allow the female screw screwed on the male screw to move in an axial direction of the male screw to move the focus lens FL in the optical axis direction.

The zoom lens control section 310 (a driving part and a control part) and the diaphragm control section 330 (a driving part and a control part) as well as the focus lens control section 320 described above can adopt a configuration in which a stepping motor or a servo motor is pulse-driven.

Drive Processing in Image-Capturing Device 100

Figure 4:
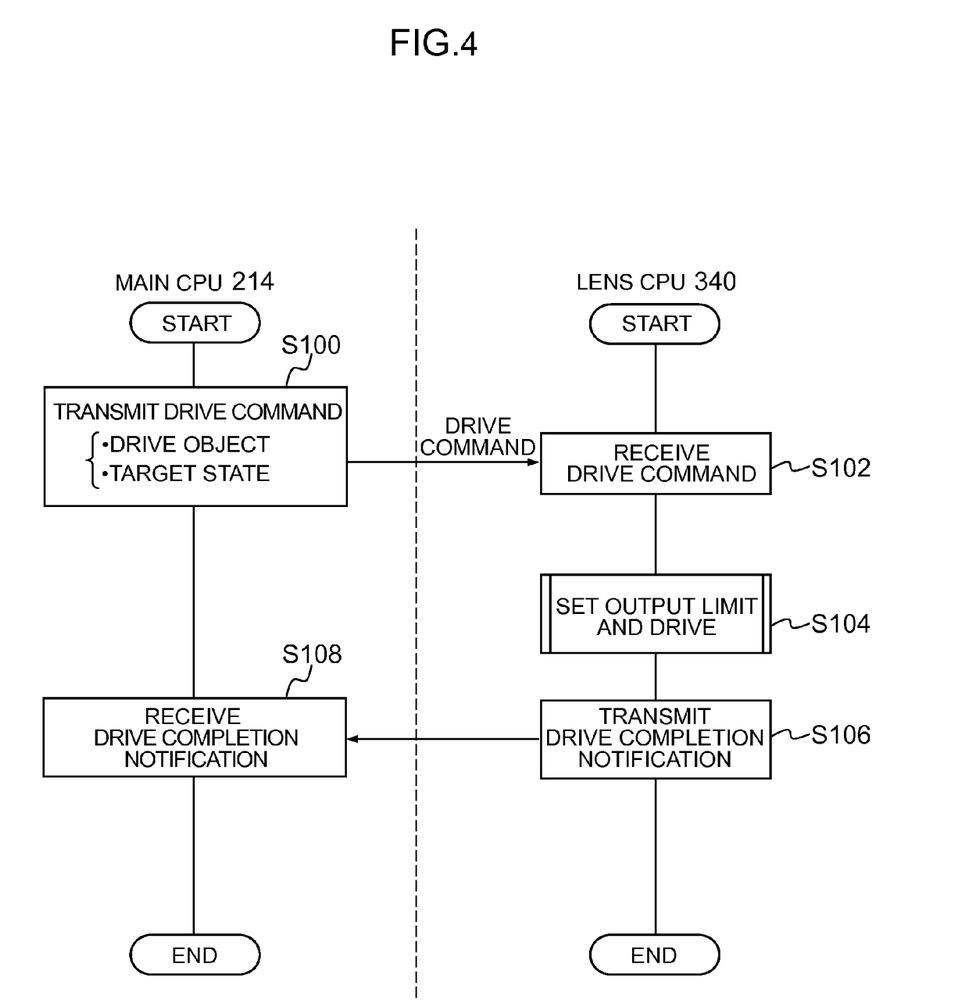
FIG. 4 is a flow chart showing an outline of lens drive sequence in the image-capturing device 100.

FIG. 4 is a flow chart showing an outline of drive processing in the image-capturing device 100. The drive processing is performed on the basis of programs and data stored in the flash ROM 226 and the ROM 228 of the image-capturing device body 200, and the drive program and necessary data stored in the ROM 344 of the lens device 300. First, at S100, the main CPU 214 of the image-capturing device body 200 transmits the drive command to the lens CPU 340 of the lens device 300, and the lens CPU 340 receives the drive command at S102 (receiving step). The transmission and reception of the drive command is performed through the mount 246 and the mount communication section 250 of the image-capturing device body 200, and the mount 346 and the mount communication section 350 of the lens device 300, as described above. The drive command includes an optical member to be a drive object (the zoom lens ZL, the focus lens FL, and the diaphragm I), and a target state of the optical member (target positions of the lenses, a diaphragm value, and the drive target).

When the transmission and reception of the drive command are performed at S100 and S102, the lens CPU 340 of the lens device 300 sets a limit value (current limit value) of an output current to start drive (S104: a control step and a drive step). When the drive is completed, the lens CPU 340 transmits a drive completion notification to the main CPU 214. It is possible to transmit the drive completion notification by varying a level of a signal (busy signal) for control status communication showing an operation status of the lens CPU 340 in a range between High and Low levels, for example.

Drive at the Time of Turning on a Power Source

Figure 5:
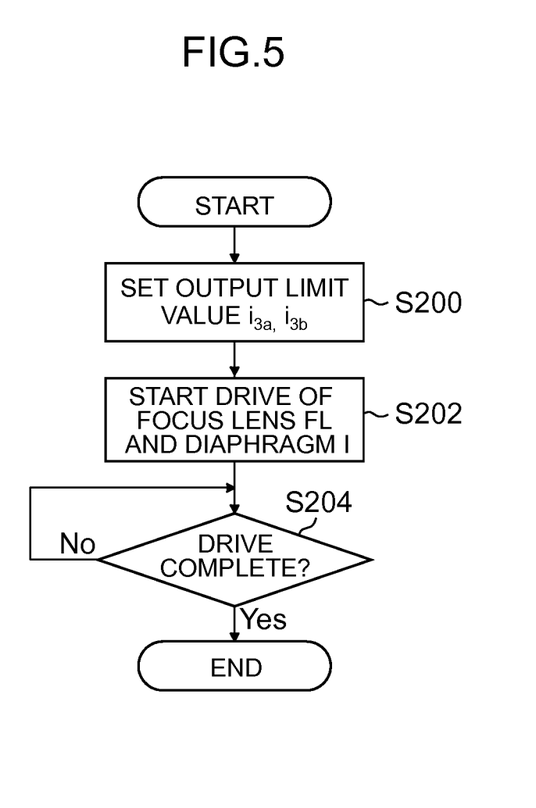

FIG. 5 is a flow chart showing an example of drive processing (a drive step and a control step). Herein, a case where the focus lens FL and the diaphragm I are driven (home position search and initial position movement) at startup (at the time of turning on a power source) is described. This processing is performed on the basis of the drive program stored in the ROM 344 of the lens device 300 and data required for the drive program.

When a power source of the image-capturing device 100 is turned on to supply power to the lens device 300, the lens CPU 340 can recognize that power is supplied without relying on a drive command from the main CPU 214 as described at S100 in FIG. 4. The lens CPU 340 then sets output limit values i3a and i3b of current (third current) with respect to the driving circuit 324 (motor driver) of the focus lens FL and a driving circuit (not shown) of the diaphragm I, respectively, at S200 (control step) without relying on a drive command. The output limit value i3a is less than a rated current of the driving circuit 324 as well as the output limit value i3b of the driving circuit of the diaphragm I is less than a rated current of the driving circuit. In addition, in order to enable the focus lens FL and the diaphragm I to be simultaneously driven, a total of the output limit values i3a and i3b is equal to or less than a value of a maximum supply current from the image-capturing device body 200.

If the rated current of the driving circuit 324, the rated current of the driving circuit of the diaphragm I, and the maximum supply current from the image-capturing device body 200, are set at 600 mA, 400 mA, and 800 mA, respectively, for example, it is possible to set the output limit value i3a for the driving circuit 324 at 500 mA, and the output limit value i3b for the driving circuit of the diaphragm I at 300 mA. A total of the output limit values i3a and i3b is 800 mA and equal to or less than the maximum supply current. The output limit values i3a and i3b are absolute values, so that the values can take a positive or negative value depending on driving directions of the focus lens FL and the diaphragm I.

When an output limit value is set at S200 (control step), processing proceeds to S202 (drive step) to drive the focus lens FL and the diaphragm I to start home position search and initial position drive. When the focus lens FL and the diaphragm I reach the home positions and the initial positions (drive target) to complete the drive (Yes at S204), the startup is completed to allow photographing to be available.

As above, in the image-capturing device 100, the output limit values i3a and i3b are set so that the focus lens FL and the diaphragm I can be simultaneously driven without relying on a drive command when the power source is turned on. As a result, there is no increase in processing time due to communicating between the image-capturing device body 200 and the lens device 300, or individually driving the focus lens FL and the diaphragm I, so that it is possible to reduce a time from the startup until photographing becomes available. Thus, possibility that a user feels stress for a long startup time or misses a good opportunity for taking a good photograph is reduced. In the time of turning off the power source as well as in the time of turning of the power, it is possible to reduce a time until the power source is turned off by setting output limit values i3a and i3b which enables the focus lens FL and the diaphragm I to be simultaneously driven, respectively, and by driving the focus lens FL and the diaphragm I (drive to a retreat position) at the limit value or less.

Focus Drive at the Time of Photographing

Next, drive of the focus lens FL at the time of photographing is described.

Figure 6:
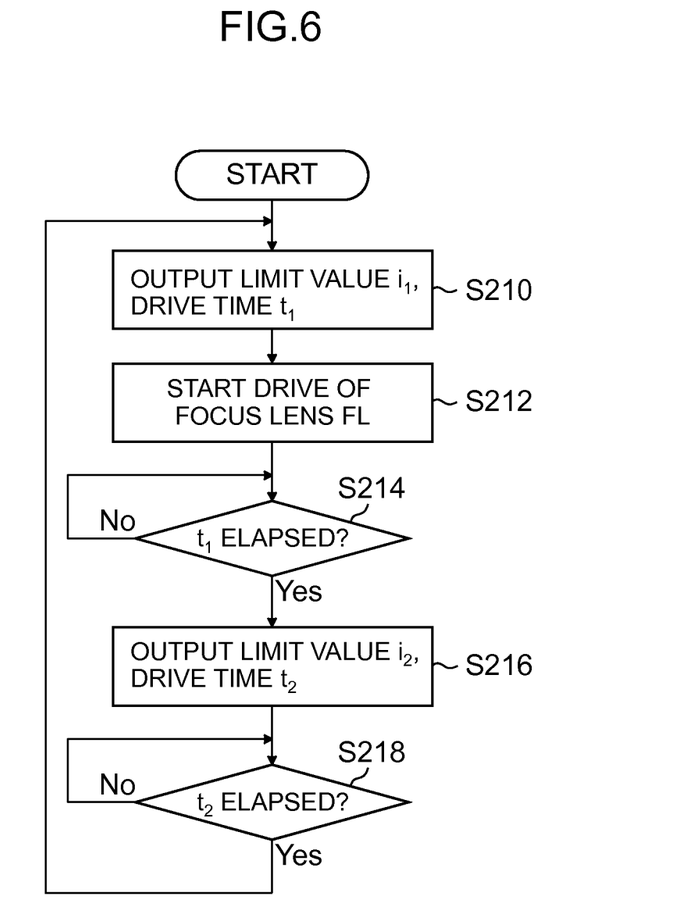
FIG. 6 is a flow chart showing another example of setting of the output limit value and the drive.

FIG. 6 is a flow chart showing drive (a drive step and a control step) of the focus lens FL at the time of photographing. When a release button 220-1 is pressed halfway down, this processing of the drive is performed on the basis of a drive command from the main CPU 214 as described at S100 in FIG. 4. At the time of starting the drive shown in FIG. 6, the drive at the time of turning on the power source described above is assumed to be finished.

At S210 (control step), an output limit value i1 (first current), and a drive time t1 (first drive time) at the output limit value it for the driving circuit 324 (motor driver) of the focus lens FL are set. In the driving circuit 324, a rated current (continuous rated current) that is a "values of current allowed to continuously flow" is determined so as to be lower than an absolute maximum rated current that is "a current value that is not allowed to be exceeded even instantaneously" with a margin, therefore, there is no problem if a current exceeds the rated current for a short time (this time is indicated as a drive time t1). Similar to the example described above, if the rated current of the driving circuit 324 and the maximum supply current are set at 600 mA and 800 mA, respectively, the output limit value it can be set at 800 mA, for example (this value should be less than the absolute maximum rated current). Although the drive time t1 depends on a configuration of the driving circuit 324 and the output limit value i1, it can be set at 0.5 sec., for example.

When the output limit value it and the drive time t1 are set at S210, the drive of the focus lens FL is started with the set values (S212: drive step). As described above, since the output limit value it is the rated current or more, it is impossible to exceed the value for a long time. Thus, when the drive time t1 elapsed (Yes at S214), an output limit value i2 (second current) less than the rated current and a drive time t2 (second drive time) at the output limit value i2 are set (S216: control step) to drive the focus lens FL for the drive time t2 at the output limit value i2 (during No at S218: drive step). Similar to the example described above, if the rated current of the driving circuit 324 is set at 600 mA, the output limit value i2 can be set at 590 mA, for example. Although the drive time t2 depends on a configuration of the driving circuit 324, it can be set at 0.5 sec., for example (it is unnecessary that the values t1 and t2 are the same). Then, first drive of driving for the drive time t1 at the output limit value i1 and second drive of driving for the drive time t2 at the output limit value i2 are repeated until the drive is completed. If the drive is performed at the output limit value i1 equal to or more than the rated current of the driving circuit 324, there is possibility that the driving circuit 324 and the motor 326 may generate heat, however, after the drive time t1 elapsed, the focus lens FL is driven at the output limit value i2 less than the rated current for the drive time t2 to reduce temperature, thereby enabling the focus lens FL to be driven again at the output limit value i1 equal to or more than the rated current.

In an example of FIG. 6, the first drive of driving for the drive time t1 at the output limit value it and the second drive of driving for the drive time t2 at the output limit value i2 are repeated until the drive is completed, thereby enabling the drive of the focus lens FL to be completed in a short time. The drive of the focus lens FL is started from the first drive to reduce a time until the drive is completed as much as possible. In addition, if the drive to a target position (drive target) is completed while the first drive and the second drive are repeated, the processing of FIG. 6 is then finished.

Figure 7:
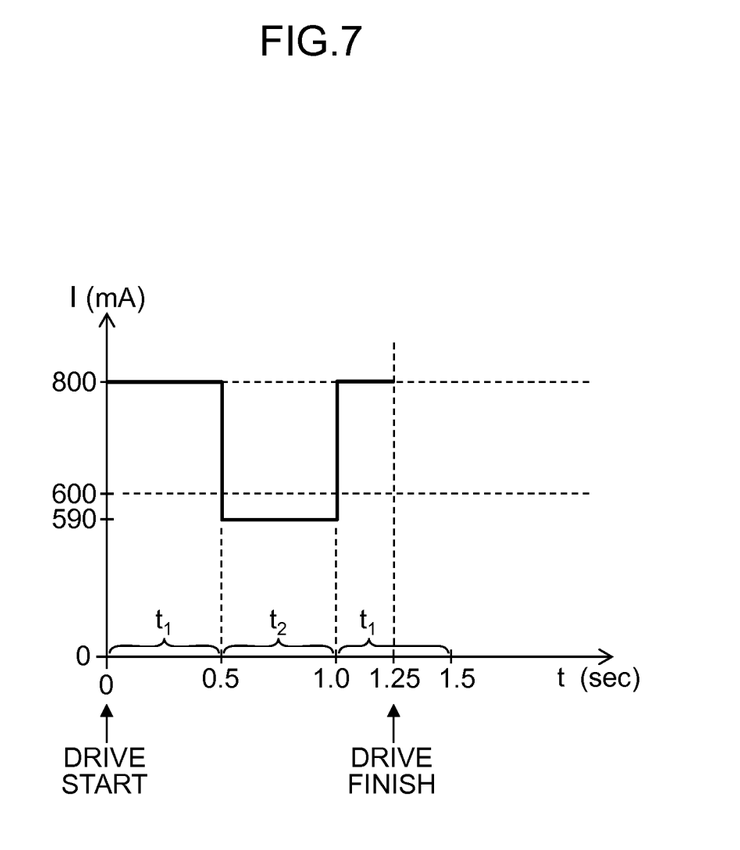
FIG. 7 shows a state of change in the output limit value with time in the drive of the focus lens FL.

FIG. 7 shows an image of the repeat of the first drive and the second drive described above. In an example of FIG. 7, the output limit value i1 and i2 are set at 800 mA and 590 mA, respectively, and each of the drive times t1 and t2 is set at 0.5 sec., and the first drive and the second drive are repeated to finish the drive in a total of 1.25 sec.

In the examples above, a case of driving the focus lens FL at the time of photographing is described, however, in the zoom lens ZL as well as in the focus lens FL, it is possible to perform drive in a short time by repeating the first drive and the second drive.

Drive of the Zoom Lens ZL, the Focus Lens FL, and the Diaphragm I, when the Power Source is Turned On In the example of FIG. 5 described above, a case of simultaneously driving the focus lens FL and the diaphragm I at the time of startup (when the power source is turned on) is described, however, the zoom lens ZL, the focus lens FL, and the diaphragm I, may be simultaneously driven at the time of startup (when the power source is turned on). In this case, similar to the example of FIG. 5, in response to detection of turning on of the power source, an output limit value i3c (third current) less than a rated current of a driving circuit (motor driver: not shown) of the zoom lens ZL is set without relying on a drive command from the image-capturing device body 200. At this time, in order to enable the zoom lens ZL, the focus lens FL and the diaphragm I to be simultaneously driven, the output limit values i3a, i3b and i3c are set so that a total of the output limit values become equal to or less than a value of a maximum supply current from the image-capturing device body 200.

If the rated current of the driving circuit 324 of the focus lens FL, the rated current of the driving circuit of the diaphragm I, the rated current of the driving circuit of the zoom lens ZL, and the maximum supply current from the image-capturing device body 200, are set as 600 mA, 400 mA, 600 mA, and 800 mA, respectively, for example, it is possible to set the output limit value i3a for the driving circuit 324, the output limit value i3b for the driving circuit of the diaphragm I, and the output limit value i3c for the driving circuit of the zoom lens ZL, at 300 mA, 200 mA, and 300 mA, respectively. A total of the output limit values i3a, i3b, and i3c is 800 mA which is equal to or less than the maximum supply current. Then, the home position search and the initial position drive are performed by allowing the focus lens FL, the diaphragm I, and the zoom lens ZL, to be simultaneously driven with current equal to or less than the output limit values i3a, i3b, and i3c, respectively, whereby it is possible to reduce the startup time and shorten the time until photographing becomes available.

As described above, the present invention is described by referring to the embodiment, however, the technical scope of the present invention is not limited to the scope described in the embodiment above. It is obvious to a person skilled in the art that various variations and modifications are possible to be applied to the embodiment, and it is obvious from the description of each of the claims that an aspect to which the variations and modifications are applied is included in the technical scope of the present invention.

There is no explicit description of "prior to", "in advance" and the like about the execution sequence of each of processing such as the operations, the procedures, the steps, and the stages, in the device, the system, the program, and the method shown in the claims, the specification, and the drawings, therefore, it should be noted that the processing can be achieved in any order unless an output of prior processing is used in sequent processing. Even if the operation flows described in the claims, the specification, and the drawings, are described by using "first", "next", and the like, for convenience, the description does not mean that the operation should be performed in this order.

What is claimed is:

1. A lens device to be mounted on an image-capturing device body, the lens device comprising:
a receiving section configured to receive a drive command including both information indicating an optical member to be a drive object and information indicating a drive target showing a target position of the optical member from the image-capturing device body;
a driving section configured to include an electric motor and a driving circuit for driving the electric motor, the driving section driving the optical member by using the electric motor and the driving circuit to the drive target with a current equal to or less than a current limit value on the basis of the drive command; and
a controller configured to control the driving section,
wherein when driving one optical member at a time, the controller sets a first current equal to or more than a rated current of the driving section and equal to or less than a maximum supply current from the image-capturing device body, or a second current less than the rated current of the driving section, for the one optical member as the current limit value, and controls the driving section so that first drive for driving the optical member for a first time by allowing the first current to serve as the current limit value, and second drive for driving the optical member for a second time by allowing the second current to serve as the current limit value after the first drive being performed, are repeated until drive of the optical member to the drive target is completed, wherein the first drive is performed at the beginning of the driving, and wherein the rated current is the level of current permitted to continuously flow within the electric motor.

2. The lens device according to claim 1, wherein when allowing a plurality of optical members to be simultaneously driven, the controller sets a third current as the current limit value, the third current being less than the rated current of each of the plurality of optical members, and a total of the third current of each of the plurality of optical members is to be the maximum supply current or less.

3. The lens device according to claim 2, wherein when turning on and off a power source, the controller sets the third current as the current limit value without relying on contents of the drive command.

4. The lens device according to claim 1, wherein the optical member is at least one of a zoom lens, a focus lens, and a diaphragm.

5. An image-capturing device comprising:
an image-capturing device body; and
a lens device to be mounted on the image-capturing device body,
the image-capturing device body including a transmitting part for transmitting a drive command including an optical member to be a drive object and a drive target of the optical member to the lens device, and
the lens device being the lens device according to claim 1.

6. A drive method of a lens device that is to be mounted on an image-capturing device body and that includes an electric motor and a driving circuit for driving the electric motor, the drive method comprising the steps of:
receiving a drive command including both information indicating an optical member to be a drive object and information indicating a drive target showing a target position of the optical member from the image-capturing device body;

driving the optical member to the drive target by using the electric motor and the driving circuit with a current equal to or less than a current limit value on the basis of the drive command; and controlling the drive in the step of driving, wherein in the step of controlling, when one optical member is driven at a time, a first current equal to or more than a rated current of a driving section of the one optical member and equal to or less than a maximum supply current from the image-capturing device body, or a second current less than the rated current of the driving section, is set for the one optical member as the current limit value, and drive of the optical member is controlled so that first drive for driving the optical member for a first time by allowing the first current to serve as the current limit value, and second drive for driving the optical member for a second time by allowing the second current to serve as the current limit value after the first drive being performed, are repeated until the drive of the optical member to the drive target is completed, wherein the first drive is performed at the beginning of the driving, and wherein the rated current is the level of current permitted to continuously flow within the electric motor.

7. A non-transitory recording medium recording a drive program allowing a lens device to perform the drive method according to claim 6.

* * * * *